US008792170B2

(12) United States Patent
Boubis et al.

(10) Patent No.: US 8,792,170 B2
(45) Date of Patent: Jul. 29, 2014

(54) OPTICAL DEVICE AND METHOD FOR CORRECTING CHROMATIC ABERRATIONS

(75) Inventors: Isac Boubis, Ashdod (IL); Dov Frieman, Rehovot (IL); Avishay Nachum, Rehovot (IL)

(73) Assignee: Elbit Systems Electro-Optics Elop Ltd., Rehovot (IL)

( * ) Notice: Subject to any disclaimer, the term of this patent is extended or adjusted under 35 U.S.C. 154(b) by 570 days.

(21) Appl. No.: 13/254,844

(22) PCT Filed: Mar. 4, 2010

(86) PCT No.: PCT/IL2010/000181
§ 371 (c)(1),
(2), (4) Date: Dec. 21, 2011

(87) PCT Pub. No.: WO2010/100648
PCT Pub. Date: Sep. 10, 2010

(65) Prior Publication Data
US 2012/0099203 A1    Apr. 26, 2012

(30) Foreign Application Priority Data
Mar. 5, 2009 (IL) ........................... 197417

(51) Int. Cl.
*G02B 5/18* (2006.01)
*G02B 13/14* (2006.01)
*G02B 27/42* (2006.01)
*G02B 27/00* (2006.01)

(52) U.S. Cl.
CPC .............. *G02B 27/42* (2013.01); *G02B 5/1895* (2013.01); *G02B 13/146* (2013.01); *G02B 27/4211* (2013.01); *G02B 27/4277* (2013.01); *G02B 27/4294* (2013.01); *G02B 27/0037* (2013.01); *G02B 27/4261* (2013.01)
USPC ......................................... 359/567; 359/356

(58) Field of Classification Search
USPC ......... 359/350–361, 558–576, 637, 742–743;
250/200, 216, 237 R, 237 G, 331.6,
250/338.1, 338.4, 339.01, 339.02, 339.05,
250/339.07, 339.11, 331.14, 340; 356/300,
356/302, 305, 319, 320, 326, 328, 331, 334
See application file for complete search history.

(56) References Cited

U.S. PATENT DOCUMENTS 5,442,480 A * 8/1995 Swanson et al. .............. 359/355
5,838,496 A    11/1998 Maruyama et al.
6,344,898 B1   2/2002 Gemma et al.

OTHER PUBLICATIONS

Y. Nevo et al.: "Use of diffractive elements to improve IR optical systems" Infrared Technology and Applications XXVIII Jul. 7-11, 2002 Seattle, WA, USA, vol. 4820, Jul. 11, 2002, pp. 744-750, XP002587389 Proceedings of the SPIE—The International Society for Optical Engineering SPIE—Int. Soc. Opt. Eng USA ISSN: 0277-786X D0I: DOI: 10.1117/12.452238.

*Primary Examiner* — Stephone B Allen
*Assistant Examiner* — Kimberly N Kakalec
(74) *Attorney, Agent, or Firm* — Soroker-Agmon

(57) ABSTRACT

Imaging device and method, the device including receiver optics, a diffractive and focusing surface, and a pair of diffractive and focusing arrangements, the receiver optics receiving radiation including a first wavelength selected from a first spectral band, and a second spectral band, where the first wavelength is substantially a multiplicative factor less than the midpoint of the second spectral band, the diffractive and focusing surface diffracting the first wavelength at an order of diffraction substantially equal to the multiplicative factor, and diffracting the second spectral band at a first order of diffraction, each of the diffractive and focusing arrangements diffracting, in turn, the first wavelength at a first order of diffraction, such that the first wavelength and the second spectral band emanating from the second diffractive and focusing arrangement focuses at a substantially common focal length and at a substantially common focal plane width.

21 Claims, 10 Drawing Sheets

OPTICAL DEVICE AND METHOD FOR CORRECTING CHROMATIC ABERRATIONS

FIELD OF THE DISCLOSED TECHNIQUE

The disclosed technique relates to optical systems in general, and to chromatic aberration, in particular.

BACKGROUND OF THE DISCLOSED TECHNIQUE

Optical systems that focus incoming light while preventing distortions are known in the art. Refraction of light occurs when the light beam passes from one medium to another, where each medium has a different refractive index, thereby causing the light beam to bend or change direction at the interface between the two media. Since the refractive index of a glass lens is sensitive to the wavelength of the light, the lens will refract light made up of at least two different wavelengths, so that each wavelength is refracted by a different amount and comes to a focus at a different focal point, resulting in a phenomenon known as chromatic aberration. Chromatic aberration is a constant source of disturbance when imaging a scene, since the position of the focal point is different for each wavelength that images the scene, resulting in colors (color "fringes") at the edges between high contrast regions of the image. For example, forward looking infrared (FLIR) systems, which image a scene with wavelengths in the near infrared (NIR) and mid-wavelength infrared (MWIR) ranges, where the wavelengths of MWIR can be substantially four times the wavelengths of NIR, are prone to such chromatic aberrations.

There are two types of chromatic aberration. One type, known as "longitudinal chromatic aberration", is described as the inability of a lens to focus different wavelengths in the same focal plane (i.e., the different wavelengths are focused at different distances from the lens, along the optical axis). When focusing parallel light, only longitudinal chromatic aberration takes place. Obliquely incident (non-parallel to the optical axis) light exhibits another type of chromatic aberration, known as "transverse (or lateral) chromatic aberration". In this case, the foci are displaced in a sideward direction in a plane perpendicular to the optical axis. Various techniques that reduce or correct chromatic aberration are known in the art, such as the use of achromatic lenses and apochromatic lenses.

Reference is now made to FIGS. 1A and 1B, which are schematic illustrations of longitudinal and lateral chromatic aberrations, respectively, as known in the art. In FIG. 1A, parallel light from a scene 50, made up of two wavelengths ($\lambda_1, \lambda_2$), passes through optics 60, and comes to a focus at two distinct focal lengths along optical axis Z. The shorter wavelength $\lambda_1$ comes to a focus at a first focal length $F_{length1}$, whereas longer wavelength range $\lambda_2$ comes to a focus at a second focal length $f_{length2}$, thus exhibiting the phenomenon of longitudinal chromatic aberration. In FIG. 1B, oblique light from scene 50, made up of two wavelengths ($\lambda_1, \lambda_2$), passes through optics 60, and comes to a focus at two distinct focal plane widths. Shorter wavelength range $\lambda_1$ is focused at a first focal plane width $f_{width1}$, whereas longer wavelength range $\lambda_2$ is focused at a second focal plane width $f_{width2}$, thus exhibiting the phenomenon of lateral chromatic aberration.

In a publication entitled "Use of diffractive elements to improve IR optical systems", SPIE, Vol. 4820, 2003, pp. 744, Nevo et al. disclose the replacement of conventional optical arrangements by diffractive ones in order to improve the performance of infrared (IR) optical systems. An optical system disclosed by Neva et al. consists of an objective composed of zinc selenide (ZnSe) and germanium (Ge) lenses, where one side of the Ge lens surface has a diffractive pattern etched onto it. The objective lens is achromatic and passively athermalized, as known in the art. An alternative optical system is proposed which includes an objective made of indium antimonide (InSb) as a focal plane array (FPA) sensor at MWIR spectral range. The optics includes zinc sulfide (ZnS), calcium fluoride ($CaF_2$), silicon (Si) and Ge lenses, such that the requirement is to image a 1.06 micron laser spot on the InSb sensor. A new design, composed of one front ZnS lens and five additional ZnSe lenses, enables the transmittance of both the MWIR and the 1.06 micron spectral bands. Two diffractive surfaces are added to correct for chromatic aberration at the MWIR wavelength. A third diffractive surface focuses the 1.06 micron spot in the same plane as the MWIR image.

SUMMARY OF THE DISCLOSED TECHNIQUE

In accordance with one aspect of the disclosed technique, there is thus provided an imaging device for correcting longitudinal and transverse chromatic aberrations. The imaging device includes receiver optics, a diffractive and focusing surface optically coupled with the receiver optics, a first diffractive and focusing arrangement optically coupled with the diffractive and focusing surface, and a second diffractive and focusing arrangement optically coupled with the first diffractive and focusing arrangement. The receiver optics receives radiation emanating from a scene, the radiation including a first wavelength selected from a first spectral band, and further including a second spectral band, where the first wavelength is substantially a multiplicative factor less than the midpoint of the second spectral band. The diffractive and focusing surface diffracts the first wavelength received from the receiver optics at an order of diffraction substantially equal to the multiplicative factor, and further diffracts the second spectral band received from the receiver optics at a first order of diffraction. The first diffractive and focusing arrangement diffracts the first wavelength received from the diffractive and focusing surface at a first order of diffraction. The second diffractive and focusing arrangement diffracts the first wavelength received from the first diffractive and focusing arrangement at a first order of diffraction, such that the first wavelength and the second spectral band emanating from the second diffractive and focusing arrangement focuses at a substantially common focal length along an optical axis, and at a substantially common focal plane width perpendicular to the optical axis.

In accordance with a further aspect of the disclosed technique, there is thus provided a method for correcting longitudinal and transverse chromatic aberrations. The method includes the procedure of receiving radiation emanating from a scene, the radiation including a first wavelength selected from a first spectral band, and further including a second spectral band, where the first wavelength is substantially a multiplicative factor less than the midpoint of the second spectral band. The method further includes the procedure of diffracting the first wavelength at an order of diffraction substantially equal to the multiplicative factor, and further diffracting the second spectral band at a first order of diffraction, with a diffractive and focusing surface. The method further includes the procedure of diffracting the first wavelength received from the diffractive and focusing surface at a first order of diffraction, with a first diffractive and focusing arrangement. The method further includes the procedure of diffracting the first wavelength received from the first diffractive and focusing arrangement at a first order of diffraction, with a second diffractive and focusing arrangement, such that the first wavelength and second spectral band emanating from the second diffractive and focusing arrangement focuses at a substantially common focal length along an optical axis, and at a substantially common focal plane width perpendicular to the optical axis.

BRIEF DESCRIPTION OF THE DRAWINGS

The disclosed technique will be understood and appreciated more fully from the following detailed description taken in conjunction with the drawings in which.

DETAILED DESCRIPTION OF THE EMBODIMENTS

The disclosed technique overcomes the disadvantages of the prior art by correcting both longitudinal and transverse chromatic aberrations. The disclosed technique provides an imaging device and method employing a receiver optics assembly and diffractive and focusing arrangements, for imaging light having two wavelength groups, a first wavelength selected from a first spectral band, and a second spectral band. At least two sets of diffractive optics are provided, which diffract each of the two wavelength groups at varying orders of diffraction, such that both wavelength groups are focused toward a common focal length and a common focal width, thereby reducing chromatic aberrations caused by the receiver optics.

Figure 2:
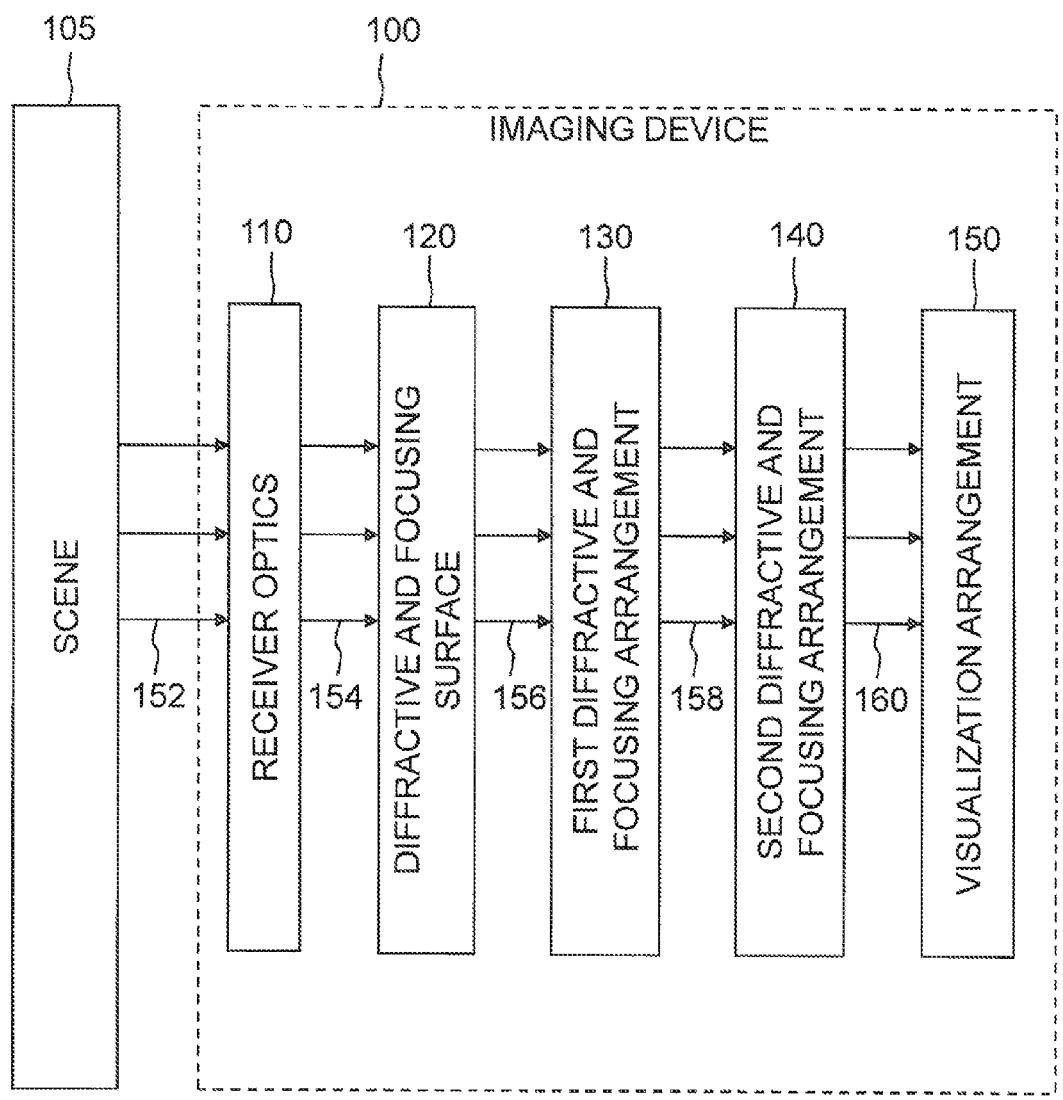
FIG. 2 is a schematic illustration of an imaging device for correcting chromatic aberrations, constructed and operative in accordance with an embodiment of the disclosed technique.

Reference is made to FIG. 2 which is a schematic illustration of an imaging device, generally referenced 100, for correcting chromatic aberrations, constructed and operative in accordance with an embodiment of the disclosed technique. Imaging device 100 includes receiver optics 110, diffractive and focusing surface 120, first diffractive and focusing arrangement 130, second diffractive and focusing arrangement 140, and visualization arrangement 150. Receiver optics 110 is optically coupled with diffractive and focusing surface 120. Diffractive and focusing surface 120 is optically coupled with first diffractive and focusing arrangement 130. First diffractive and focusing arrangement 130 is optically coupled with second diffractive and focusing arrangement 140, which is optically coupled with visualization arrangement 150. It is noted that visualization arrangement 150 is optional, and the disclosed technique is also applicable to an imaging device without visualization arrangement 150.

Visualization arrangement 150 is adapted to visualize infrared (IR) radiation by means of a display device or viewing optics. Visualization arrangement 150 may also be embodied by a semiconductor imaging device. Receiver optics 110 is adapted to receive radiation 152 emanating from a scene 105. The radiation includes a first wavelength $\lambda_1$ selected from a first spectral band, and further includes a second spectral band $\lambda_2$ that is longer than the first spectral band. In general, $\lambda_1$ is substantially a multiplicative factor less than the midpoint of $\lambda_2$, such that the first (shorter) spectral band is substantially a third, a quarter, or a fifth of the second (longer) spectral band. In other words, the longer wavelength range is substantially three, four, or five times that of the shorter wavelength range, for reasons elaborated below. According to one embodiment of the disclosed technique, $\lambda_1$ is selected within the range of 0.8-1.8 μm (e.g., $\lambda_1$ is approximately 1.06 μm±10 nm) and $\lambda_2$ is approximately 3-5 μm, and preferably 3.6-4.9 μm. It is noted that $\lambda_1$ is generally monochromatic, although the disclosed technique is more generally applicable to any two spectral bands that meet the aforementioned criteria. For exemplary purposes, the following description will be based on the situation where wavelength $\lambda_1$ is substantially a quarter of the midpoint of spectral band $\lambda_2$.

Receiver optics 110 conveys the radiation (referenced 154) toward diffractive and focusing surface 120, which conveys the radiation (referenced 156) toward first diffractive and focusing arrangement 130. First diffractive and focusing arrangement 130 conveys the radiation (referenced 158) toward second diffractive and focusing arrangement 140, which in turn conveys the radiation (referenced 160) toward visualization arrangement 150. In order to correct for the two types of chromatic aberration in the imaged radiation, diffractive and focusing surface 120 and diffractive and focusing arrangements 130 and 140 are employed and configured to transmit varying orders of diffraction of $\lambda_1$ and $\lambda_2$.

With respect to wavelength $\lambda_1$, constructive interference takes place for the fourth order of diffraction (where wavelength $\lambda_1$ is substantially a quarter of the midpoint of spectral band $\lambda_2$) through diffractive and focusing surface 120. In general, the order of diffraction through diffractive and focusing surface 120 is a whole number substantially equal to the multiplicative factor by which the spectral band $\lambda_2$ midpoint is greater than wavelength $\lambda_1$. Accordingly, if wavelength $\lambda_1$ is a third of the midpoint of spectral band $\lambda_2$, then diffractive and focusing surface 120 diffracts $\lambda_1$ at a third order of diffraction, while if wavelength $\lambda_1$ is a fifth of the midpoint of spectral band $\lambda_2$, then diffractive and focusing surface 120 diffracts $\lambda_1$ at a fifth order of diffraction. With respect to spectral band $\lambda_2$, constructive interference takes place for the first order of diffraction through diffractive and focusing surface 120. The diffraction orders of $\lambda_1$ and $\lambda_2$ through diffractive and focusing surface 120 partially reduce both longitudinal and transverse chromatic aberration of $\lambda_1$ and $\lambda_2$.

The diffraction orders of $\lambda_1$ and $\lambda_2$ through diffractive and focusing arrangements 130 and 140 further reduce both longitudinal and transverse chromatic aberration of $\lambda_1$. With respect to $\lambda_1$, constructive interference takes place for the first order of diffraction through each of diffractive and focusing arrangements 130 and 140. With respect to $\lambda_2$, no constructive interference takes place through diffractive and focusing arrangements 130 and 140. Instead, the so-called zeroth order diffraction (straight-through) beam is brought to a focus. The diffraction orders of $\lambda_1$ and $\lambda_2$ transmitted through diffractive elements 120, 130 and 140 are such that $\lambda_1$ and $\lambda_2$ share a focal length and a focal width. Accordingly, $\lambda_1$ is diffracted at both diffractive and focusing elements 120, 130 and 140, whereas $\lambda_2$ is diffracted only at diffractive and focusing surface 120.

It is noted that the ratio between wavelength $\lambda_1$ and spectral band $\lambda_2$ cannot be less than 1:3 (e.g., wavelength $\lambda_1$ cannot be half of the midpoint of spectral band $\lambda_2$) due to physical limitations, since the diffraction pattern in diffractive and focusing arrangements 130 and 140 that are intended for only diffracting wavelength $\lambda_1$ would also effect spectral band $\lambda_2$, thereby distorting the outgoing $\lambda_2$ radiation (since the diffraction curves corresponding to half a wavelength would be too close together). Similarly, the ratio between wavelength $\lambda_1$ and spectral band $\lambda_2$ cannot be greater than 1:5 (e.g., wavelength $\lambda_1$ cannot be a sixth of the midpoint of spectral band $\lambda_2$) due to manufacturing constraints, since the sensitivity to manufacturing errors in the diffraction pattern would be too great, and even a relatively minor error or inaccuracy in the diffraction pattern could alter the focal length and focal width of wavelength $\lambda_1$ through diffractive and focusing arrangements 130 and 140.

Figure 3:
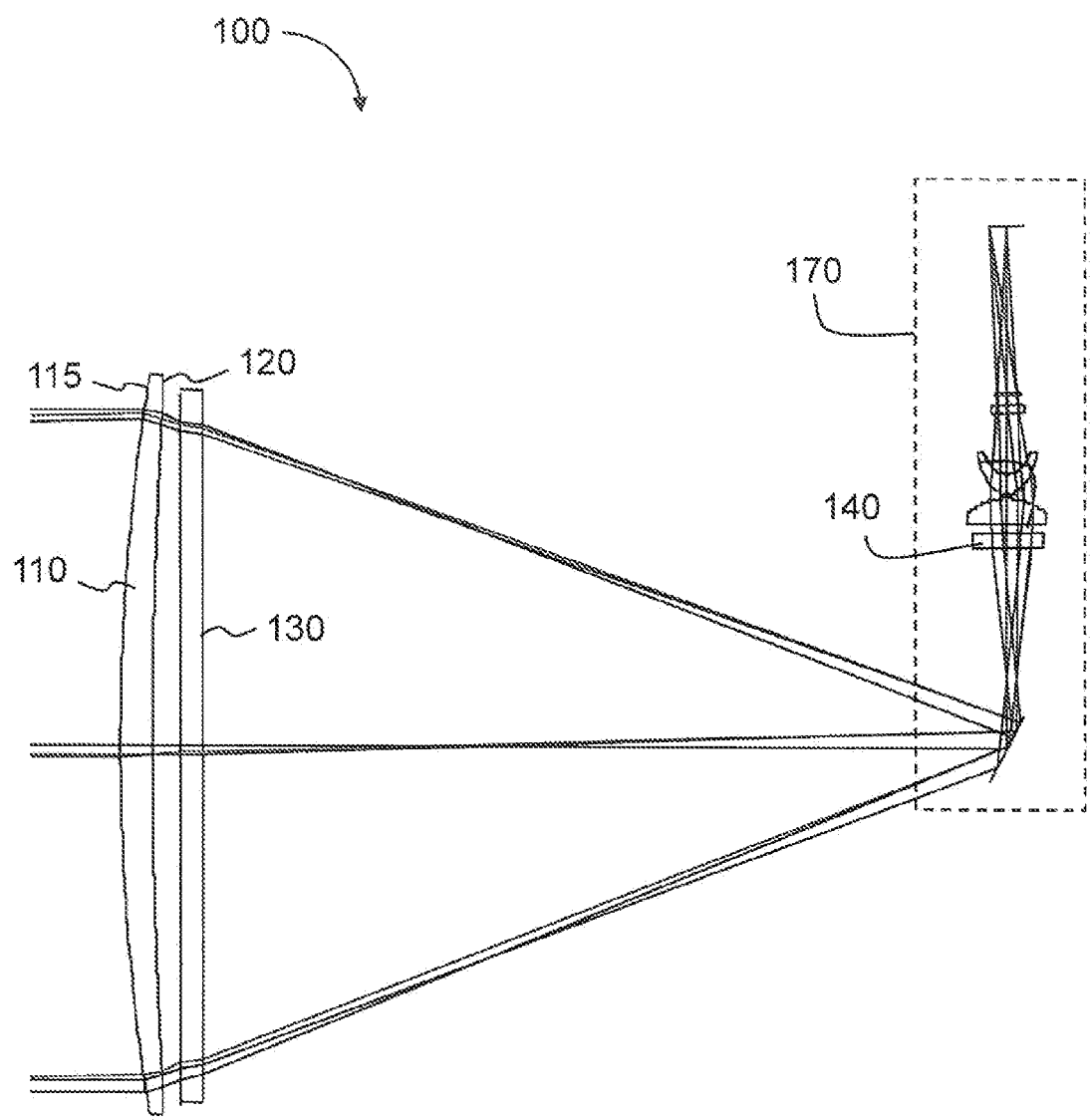
FIG. 3 is a side view illustration of the imaging device of FIG. 2, depicting the physical elements of the imaging device and the optical path, constructed and operative in accordance with an embodiment of the disclosed technique.

Reference is made to FIG. 3, which is a side view illustration of the imaging device of FIG. 2, depicting the physical elements of the imaging device and the optical path, constructed and operative in accordance with an embodiment of the disclosed technique. Imaging device 100 includes a lens 110, diffractive and focusing surface 120, diffractive and focusing arrangement 130, and relay lens 170. Lens 110 is a receiver optics lens, equivalent to receiver optics 110 of imaging device 100 (FIG. 2). Lens 110 has two surfaces: a convex surface 115 and a concave surface 120. Concave surface 120 is an aspherical diffractive surface, and is equivalent to diffractive and focusing surface 120 of imaging device 100 (FIG. 2). Convex surface 115 is a spherical surface, Relay lens 170 includes ail the optics necessary for focusing the two wavelengths onto a detector surface. Relay lens 170 further includes a complementary diffractive arrangement 140, similar to diffractive and focusing arrangement 130, which serves to correct the residual chromatic aberration in the light exiting from diffractive and focusing arrangement 130.

First diffractive and focusing arrangement 130 is disposed adjacent to diffractive and focusing surface 120 of lens 110. Second diffractive and focusing arrangement 140 is optically coupled with first diffractive and focusing arrangement 130. In general, first diffractive and focusing arrangement 130 is disposed where the optical width is substantially wide, while second diffractive and focusing arrangement 140 is disposed where the optical width is substantially narrow (e.g., about a quarter of the optical width of first diffractive and focusing arrangement 130). Accordingly, first diffractive and focusing arrangement 130 is a wide, and relatively expensive, lens, allowing for the etching or otherwise implementing a diffraction pattern with high density of diffractive closely spaced circles. The second diffractive and focusing arrangement 140 is a narrow, and relatively inexpensive, lens, allowing only for the etching or otherwise implementing a diffraction pattern with low density of diffractive closely spaced circles.

Incoming light enters imaging device 100, as shown by three groups of light rays incident on lens 110. The light is diffracted by diffractive surface 120 of lens (fourth order of diffraction for $\lambda_1$, and first order of diffraction for $\lambda_2$). The light is then further diffracted by diffractive and focusing arrangement 130 (first order of diffraction for $\lambda_1$, and zeroth order of diffraction for $\lambda_2$). Subsequently, the light is yet again diffracted by diffractive arrangement 140 of relay lens 170 (first order of diffraction for $\lambda_1$, and zeroth order of diffraction for $\lambda_2$). As a result, the final image appears with substantially no longitudinal or transverse chromatic aberration. It is noted that due to manufacturing constraints a single diffractive and focusing arrangement cannot be achieved with a sufficiently high density diffraction pattern (e.g., 40 lines/mm) that is required to diffract the entire spectral range passing through ($\lambda_1$ and $\lambda_2$). Therefore two diffractive and focusing arrangements are utilized, each having a smaller optical density (e.g., up to 12 lines/ram), such that the combination of both arrangements provides the required correction of longitudinal and transverse chromatic aberration. It is also possible to implement a series of diffractive and focusing arrangements (i.e., more than two), although this is not preferable, since the optical transmittance of each additional diffractive and focusing arrangement further reduces the amount of light passing through the entire imaging device.

Figure 4:
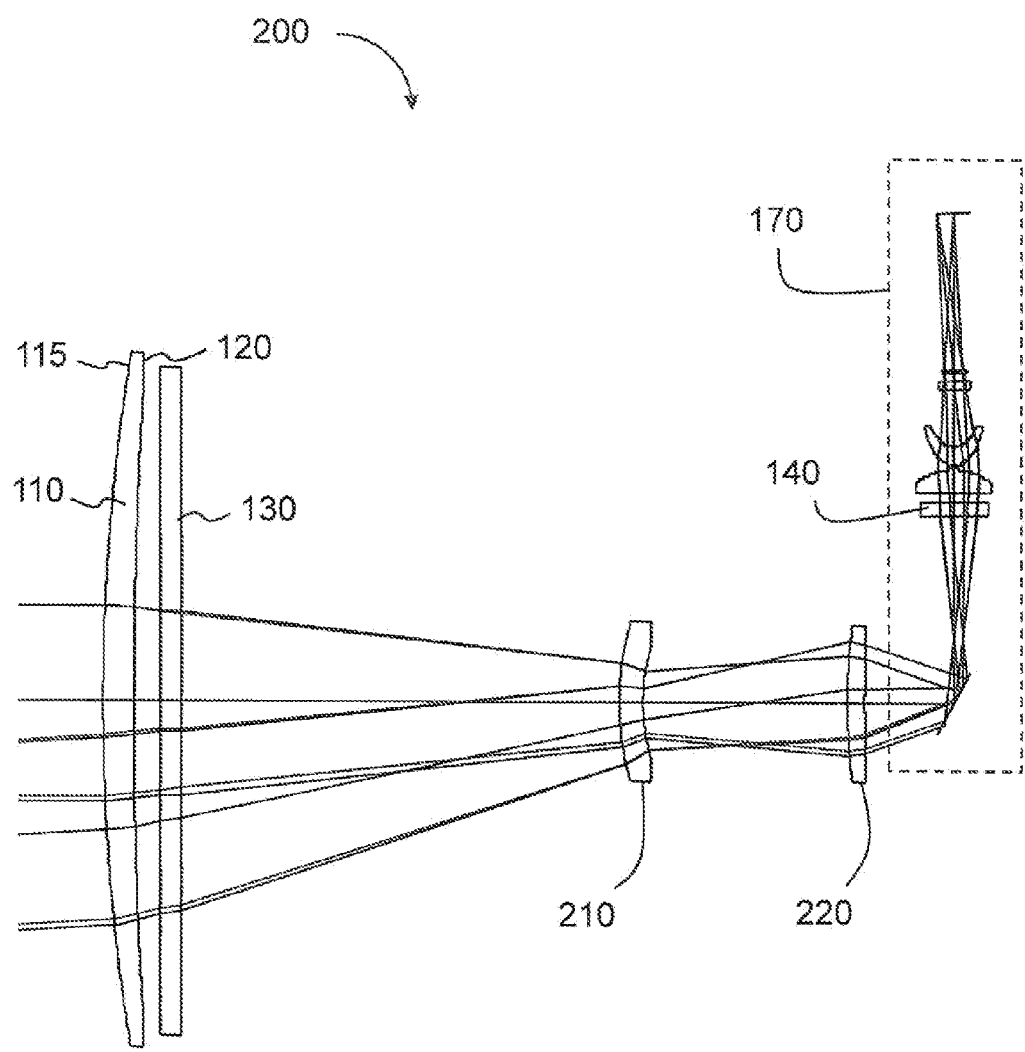
FIG. 4 is a side view illustration of an imaging device for correcting chromatic aberrations and configured to collect light from a wide field of view, constructed and operative in accordance with another embodiment of the disclosed technique.

The disclosed technique may be further extended to the imaging of a wide field of view. Reference is made to FIG. 4, which is a side view illustration of an imaging device, generally referenced 200, for correcting chromatic aberration and configured to collect light from a wide field of view, constructed and operative in accordance with another embodiment of the disclosed technique. Imaging device 200 is equivalent to imaging device 100 (FIGS. 2 and 3), with the addition of two new elements: lens 210 and lens 220. Lenses 210 and 220 serve to shorten the effective focal length without altering the focal point, thereby widening the field of view. For example, a narrow FOV of 5° coupled with a wide FOV of 15° is deemed practical for detection, recognition and identification, in accordance with Johnson's criteria. Accordingly, the pair of lenses 210 and 220 includes a diffractive and focusing surface that diffracts the incoming light in a manner similar to diffractive and focusing arrangements 130 and 140 (FIG. 3) (i.e., first order of diffraction for and zeroth order of diffraction for $\lambda_2$).

Figure 5:
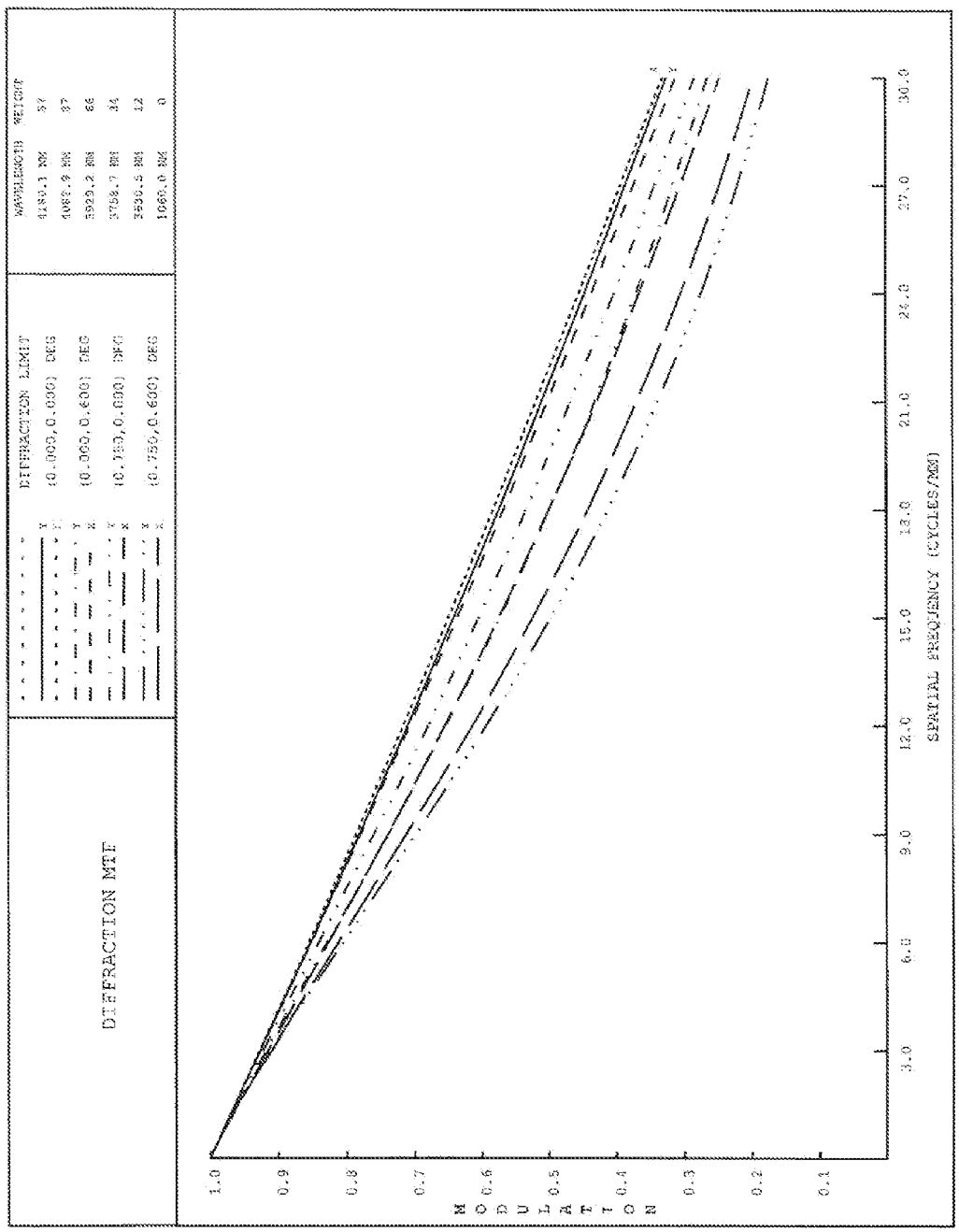
FIG. 5 is a graph of the modulation transfer function (MTF) as a function of spatial frequency for five different wavelengths in the $\lambda_2$ spectral band in four different narrow fields of view.
Figure 6:
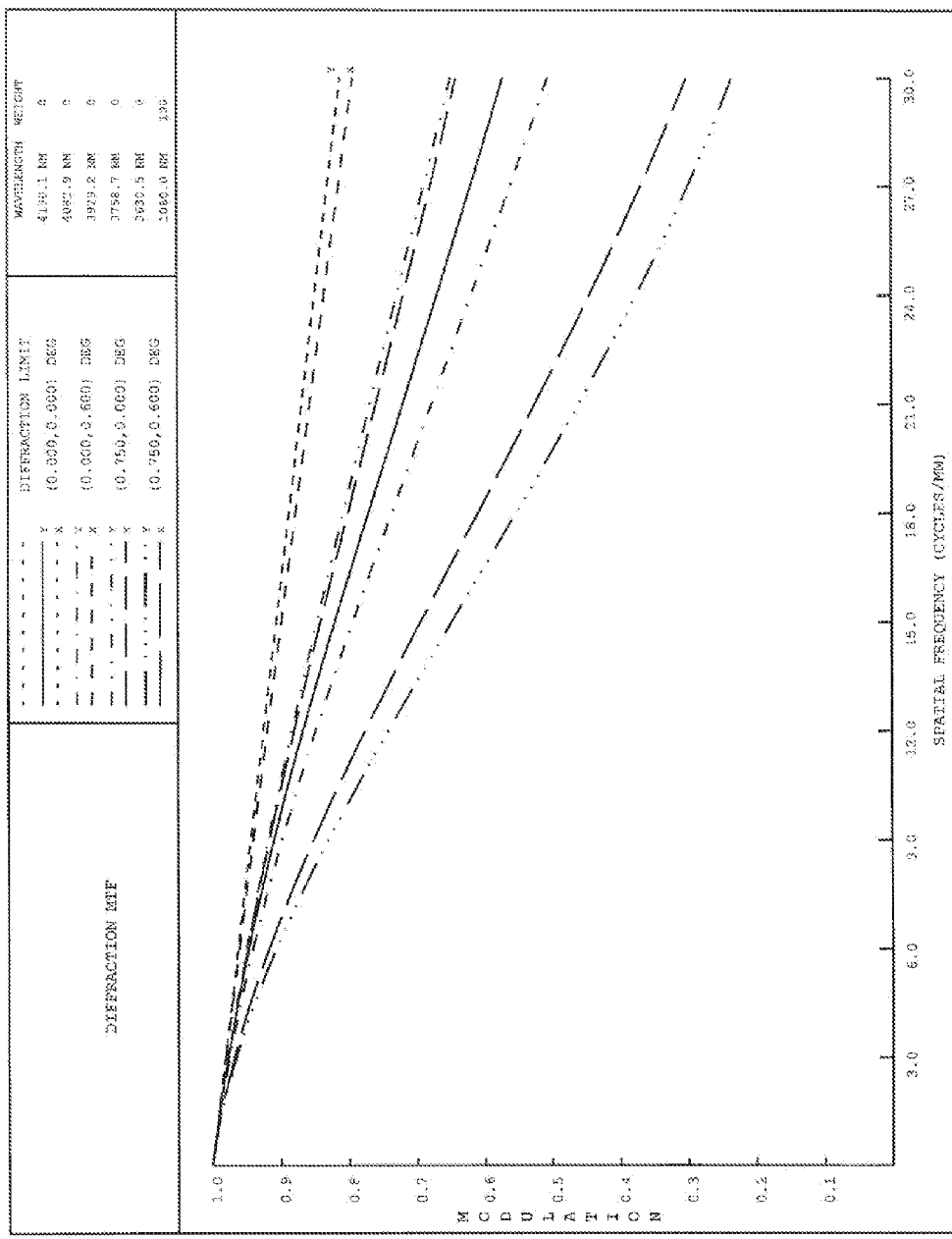
FIG. 6 is a graph of modulation transfer function (MTF) as a function of spatial frequency for the $\lambda_1$ wavelength in four different narrow fields of view.

Reference is now made to FIGS. 5 and 6. FIG. 5 is a graph of the modulation transfer function (MTF) as a function of spatial frequency for five different wavelengths in the $\lambda_2$ spectral band in four different narrow fields of view. FIG. 6 is a graph of the MTF as a function of spatial frequency for the $\lambda_1$ wavelength in four different narrow fields of view. The weight-averages of the different wavelengths for each graph are provided in the top-right corner. The diffraction limited MTF represents the "optimal" or theoretical MTF for when there is no chromatic aberration whatsoever. FIG. 5 illustrates that there is substantially no chromatic aberration over the $\lambda_2$ spectral band, as the MTF at the spatial frequency of 15 lp/mm is approximately 15% of the edge of the field of view, which is very close to the diffraction-limited MTF at that spatial frequency (approximately 65%). FIG. 6 further illustrates that the focal point for $\lambda_1$ is coincident with that of the $\lambda_2$ spectral band.

Figure 1A:
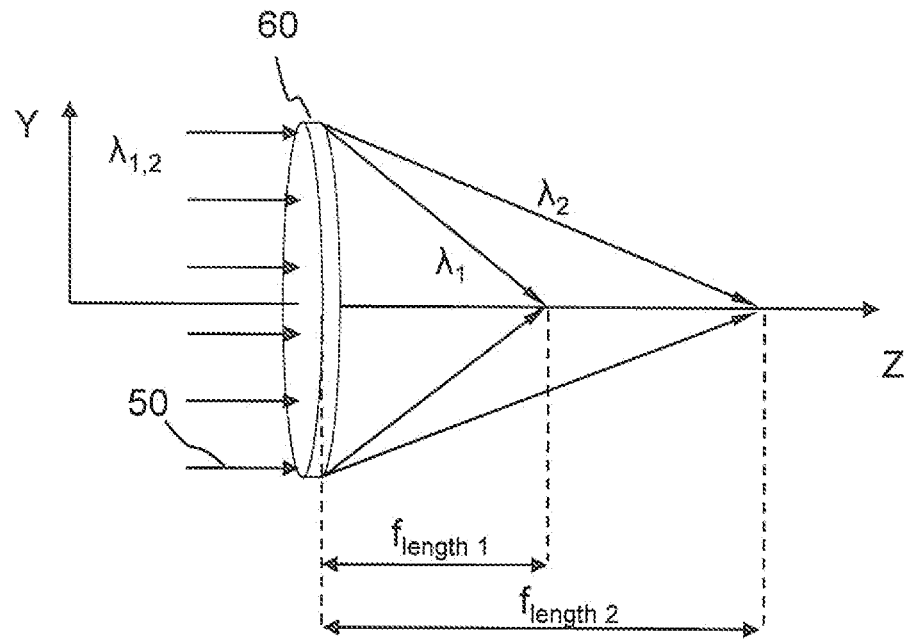
FIG. 1A is a schematic illustration of longitudinal chromatic aberration, as known in the art.
Figure 1B:
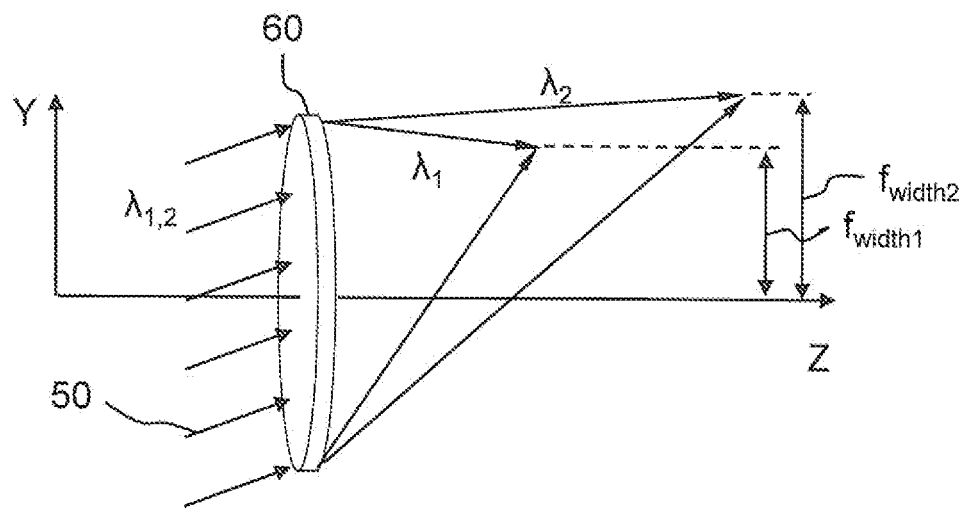
FIG. 1B is a schematic illustration of lateral chromatic aberration, as known in the art.
Figure 7A:
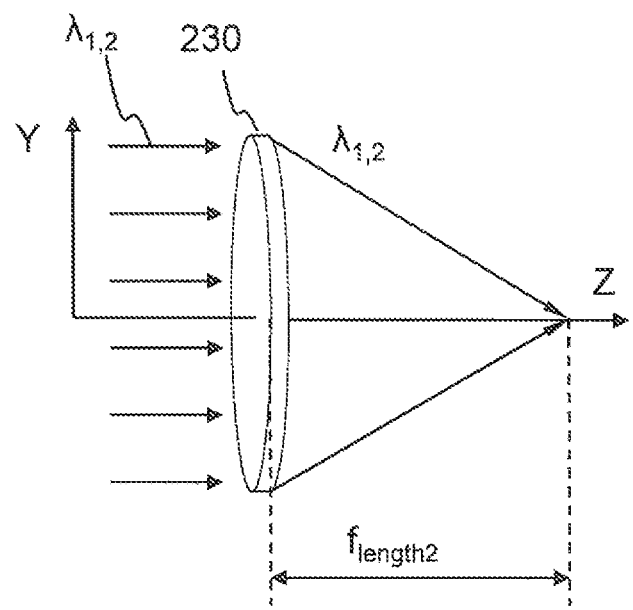
FIG. 7A is a schematic illustration of the correction of longitudinal chromatic aberration, by a diffractive and focusing arrangement, constructed and operative in accordance with an embodiment of the disclosed technique.
Figure 7B:
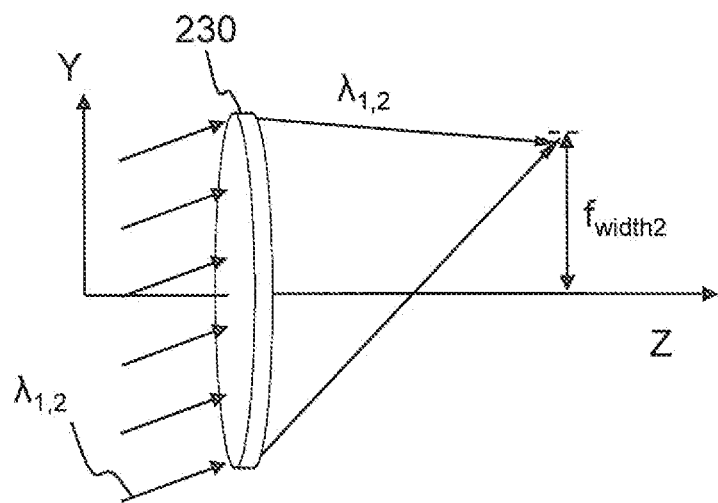
FIG. 7B is a schematic illustration of the correction of lateral chromatic aberration, by a diffractive and focusing arrangement, constructed and operative in accordance with an embodiment of the disclosed technique.

Reference is now made to FIGS. 7A and 7B. FIG. 7A is a schematic illustration of the correction of longitudinal chromatic aberration by a diffractive and focusing arrangement, generally referenced 230, in accordance with an embodiment of the disclosed technique. FIG. 7B is a schematic illustration of the correction of lateral chromatic aberration by diffractive and focusing arrangement 230, in accordance with an embodiment of the disclosed technique. Diffractive and focusing arrangement 230 is representative of diffractive and focusing surface 120, first diffractive and focusing arrangement 130, and second diffractive and focusing arrangement 140 (FIG. 2). In FIG. 7A, parallel light in the form of first and second wavelength ranges $\lambda_1$ and $\lambda_2$ enters diffractive and focusing arrangement 230. The light is focused and diffracted such that both wavelength ranges come to focus together at a common focal length $f_{length2}$ on optical axis Z. In FIG. 7B, oblique light in the form of first and second wavelength ranges $\lambda_1$ and $\lambda_2$ enters diffractive and focusing arrangement 230. The light is focused and diffracted such that both wavelength ranges come to focus in a focal plane perpendicular to axis Z at a common focal width $f_{width2}$. Thus, diffractive and focusing arrangement 230 corrects the longitudinal and lateral chromatic aberration phenomena (as illustrated in FIGS. 1A and 1B, respectively).

Figure 8A:
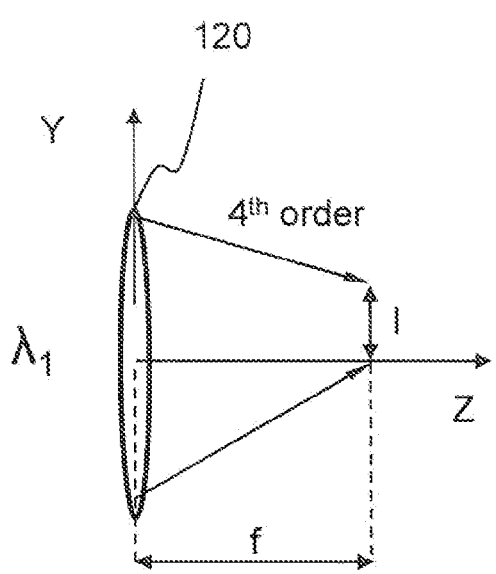
FIG. 8A is a schematic illustration of the shorter wavelength $\lambda_1$ undergoing a fourth order of diffraction through the diffractive and focusing surface of FIG. 2, in accordance with an embodiment of the disclosed technique.
Figure 8B:
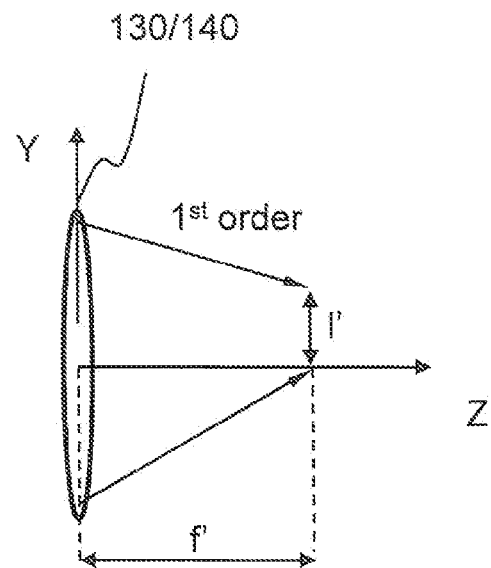
FIG. 8B is a schematic illustration of the shorter wavelength $\lambda_1$ undergoing a first order of diffraction through the diffractive and focusing arrangements of FIG. 2, in accordance with an embodiment of the disclosed technique.
Figure 8C:
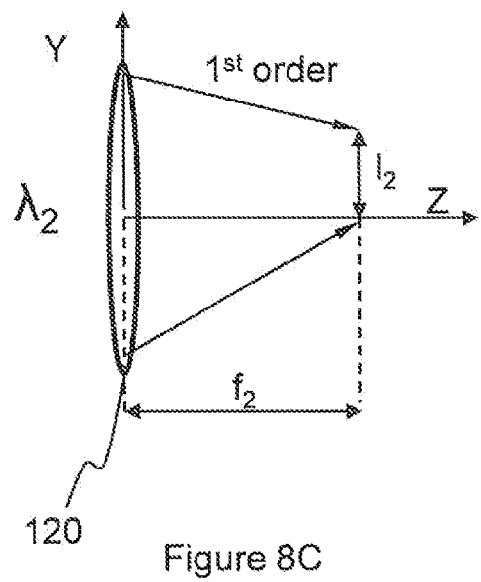
FIG. 8C is a schematic illustration of the longer wavelength $\lambda_2$ undergoing a first order of diffraction through the diffractive and focusing surface of FIG. 2, in accordance with an embodiment of the disclosed technique.
Figure 8D:
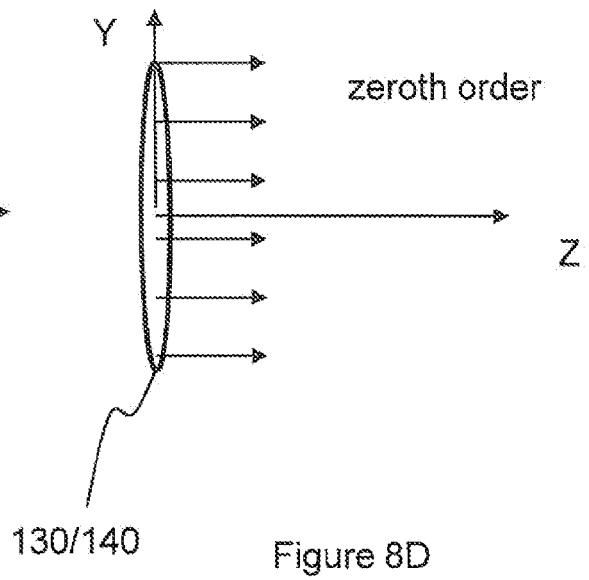
FIG. 8D is a schematic illustration of the longer wavelength $\lambda_2$ undergoing a zeroth order of diffraction through the diffractive and focusing arrangements of FIG. 2, in accordance with an embodiment of the disclosed technique.

Reference is now made to FIGS. 8A, 8B, 8C, and 8D. FIG. 8A is a schematic illustration of the shorter wavelength $\lambda_1$ undergoing a fourth order of diffraction through diffractive and focusing surface 120 of FIG. 2, in accordance with an embodiment of the disclosed technique. FIG. 8B is a schematic illustration of the shorter wavelength $\lambda_1$ undergoing a first order of diffraction through diffractive and focusing arrangements 130 and 140 of FIG. 2, in accordance with an embodiment of the disclosed technique. FIG. 8C is a schematic illustration of the longer wavelength $\lambda_2$ undergoing a first order of diffraction through diffractive and focusing surface 120 of FIG. 2, in accordance with an embodiment of the disclosed technique. FIG. 8D is a schematic illustration of the longer wavelength $\lambda_2$ undergoing a zeroth order of diffraction through diffractive and focusing arrangements 130 and 140 of FIG. 2, in accordance with an embodiment of the disclosed technique. FIGS. 8A and 8B show the effect of diffractive and focusing surface 120 and diffractive and focusing arrangements 130 and 140 respectively on $\lambda_1$. FIGS. 8C and 8E) show the effect of diffractive and focusing surface 120 and diffractive and focusing arrangements 130 and 140 respectively on $\lambda_2$. The focal length and focal width at which $\lambda_1$ is focused by diffractive and focusing surface 120 is referenced f and l, respectively (FIG. 8A). The focal length and focal width at which $\lambda_1$ is focused by diffractive and focusing arrangements 130 and 140 is referenced f' and l', respectively (FIG. 8B). The focal length and focal width at which $\lambda_2$ is focused by diffractive and focusing surface 120 is referenced $f_2$ and $l_2$, respectively (FIG. 8C). Since no diffraction takes place in FIG. 8D for $\lambda_2$ by diffractive and focusing arrangements 130 and 140, the following equations hold true:

$$f_2 = f + f'$$

$$l_2 = l + l'.$$

It should be noted that the meaning of the term "common" as used herein also encompasses the meaning of the term "substantially common". Moreover, phrases such as "both coming to focus at focal length" and "coming to focus at focal plane width" also encompass the meaning of "both substantially coming to focus at focal length" and "both substantially coming to focus at focal plane width", respectively.

It should be noted that any of diffractive and focusing elements 120, 130 or 140 may include a separate diffractive arrangement mechanically and optically coupled with a separate focusing arrangement. Alternatively, the diffractive arrangement may be integrally formed with a focusing arrangement. Further alternatively, the diffractive arrangement may merely be optically coupled with the focusing arrangement.

Figure 9:
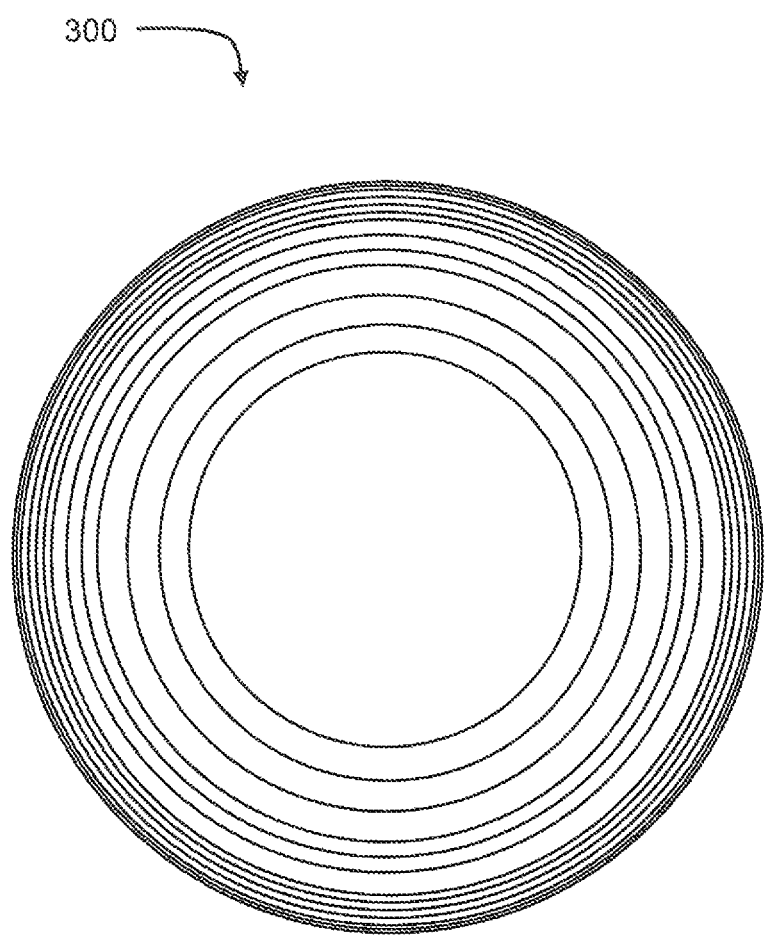
FIG. 9 is a schematic illustration of a diffractive and focusing arrangement including a series of concentric circles, constructed and operative in accordance with an embodiment of the disclosed technique.

Reference is made to FIG. 9, which is a schematic illustration of a diffractive and focusing arrangement, generally referenced 300, that includes a series of concentric circles, constructed and operative in accordance with an embodiment of the disclosed technique. FIG. 9 depicts the scoring or etching pattern that makes up the diffraction arrangement of diffractive and focusing arrangement 300. It should be noted that the concentric circles are not equidistant, but rather become gradually more closely spaced towards the perimeter of the lens. Diffractive and focusing arrangement 300 may be manufactured as is outlined by Nevo et al. in "Use of diffractive elements to improve IR optical systems", SPIE, Vol. 4820, 2003, pp. 744. Diffractive and focusing arrangement 300 may be manufactured by scoring a lens by the use of a suitable machine, employing, for example, a diamond-turning machine. The average density of the circular diffraction grating of diffractive and focusing arrangement 300 is preferably approximately 12 lines/mm.

Due to the fact that diffractive and focusing arrangement 300 is being used for a relatively short wavelength, the boundary width between rings is equal to or less than approximately 8 μm, for example, and the surface roughness is less than approximately 0.02 μm, in order to avoid, or at least minimize, scattering and efficiency loss.

Figure 10:
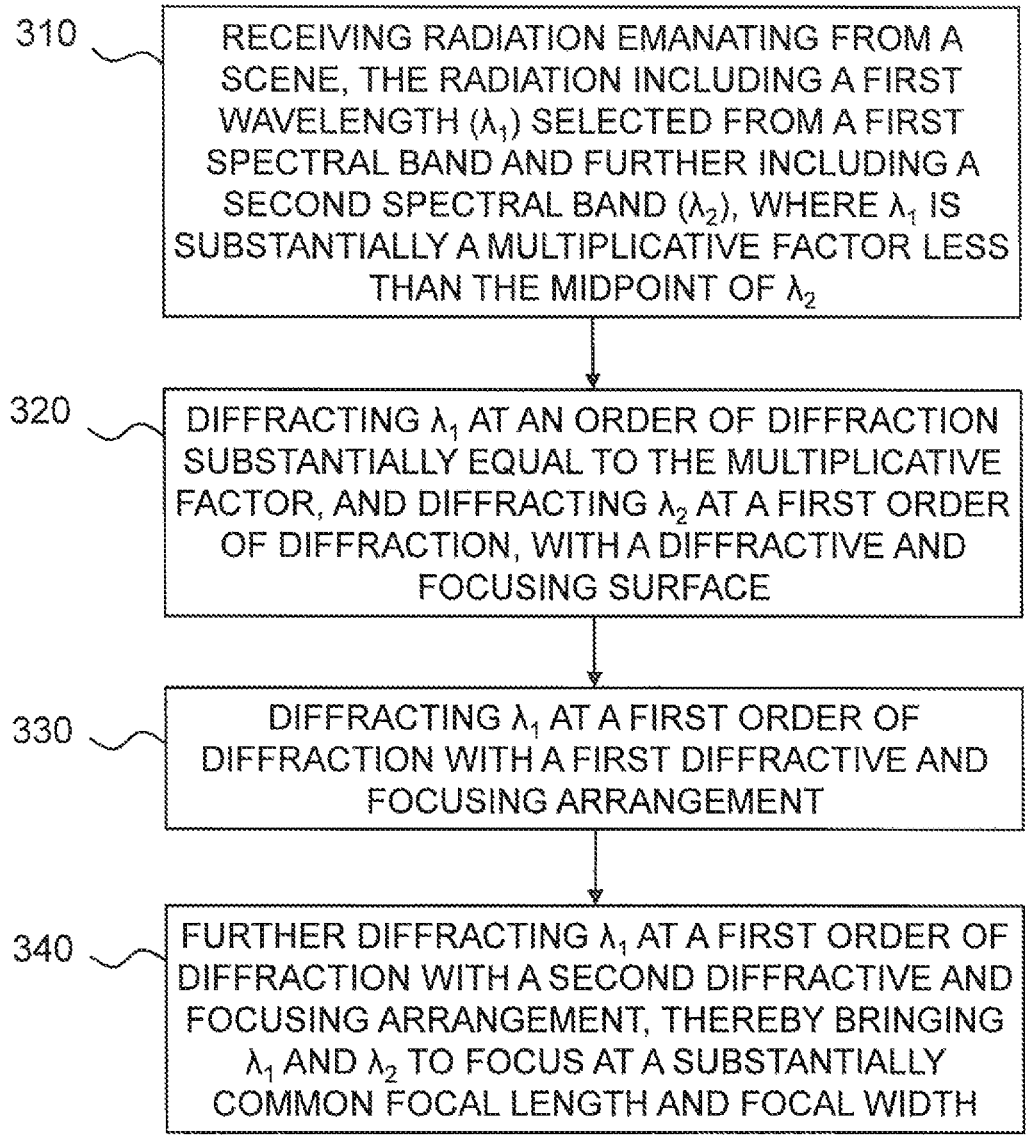
FIG. 10 is a flow chart illustration of a method for correcting chromatic aberrations, operative in accordance with an embodiment of the disclosed technique.

Reference is now made to FIG. 10, which is a flow chart illustration of a method for correcting chromatic aberrations, operative in accordance with an embodiment of the disclosed technique. As indicated in procedure 310, radiation emanating from a scene is received, the radiation including a first wavelength ($\lambda_1$) selected from a first spectral band, and further including a second spectral band ($\lambda_2$), where the first wavelength ($\lambda_1$) is substantially a multiplicative factor less than the midpoint of the second spectral band ($\lambda_2$). With reference to FIG. 2, receiver optics 110 receives radiation 152 including wavelength $\lambda_1$ and spectral band $\lambda_2$ emanating from a scene 105. The wavelength $\lambda_1$ is substantially a multiplicative factor less than the midpoint of spectral band $\lambda_2$, e.g., a quarter thereof. For example, $\lambda_1$ is approximately 1.06 μm while $\lambda_2$ is approximately 3.6-4.9 μm.

In procedure 320, the first wavelength $\lambda_1$ is diffracted at an order of diffraction substantially equal to the multiplicative factor, and the second spectral band $\lambda_2$ is diffracted at a first order of diffraction, with a diffractive and focusing surface. With reference to FIG. 8A, diffractive and focusing surface 120 diffracts wavelength $\lambda_1$ at a fourth order of diffraction (where $\lambda_1$ is substantially a quarter of the $\lambda_2$ midpoint), such that $\lambda_1$ comes to a focus at focal length f along optical axis Z and focal width l along optical axis Y. With reference to FIG. 8C, diffractive and focusing surface 120 diffracts wavelength range $\lambda_2$ at a first order of diffraction, such that $\lambda_2$ comes to a focus a focal length $f_2$ along optical axis Z and focal width $l_2$ along optical axis Y.

In procedure 330, the first wavelength range is diffracted at a first order of diffraction, with a first diffractive and focusing arrangement. With reference to FIG. 8B, first diffractive and focusing arrangement 130 diffracts wavelength $\lambda_1$ at a first order of diffraction, such that $\lambda_1$ comes to a focus at focal length f' along optical axis Z and focal width l' along optical axis Y. Referring to FIG. 8D, diffractive and focusing arrangement 130 passes through spectral band $\lambda_2$ (with no diffraction).

In procedure 340, the first wavelength range is further diffracted at a first order of diffraction, with a second diffractive and focusing arrangement, thereby bringing $\lambda_1$ and $\lambda_2$ to focus at a substantially common focal length and focal width. With reference to FIG. 8B, diffractive and focusing arrangement 140 diffracts wavelength range $\lambda_1$ at a first order of diffraction, such that $\lambda_1$ comes to a focus at focal length f' along optical axis Z and focal width l' along optical axis Y. Referring to FIG. 8D, diffractive and focusing arrangement 130 passes through spectral band $\lambda_2$ (with no diffraction). With further reference to FIGS. 7A and 7B, diffractive and focusing arrangement 230 brings both wavelengths $\lambda_1$ and $\lambda_2$ to focus together at focal length $f_{length2}$ and focal width $f_{width2}$.

It will be appreciated by persons skilled in the art that the disclosed technique is not limited to what has been particularly shown and described hereinabove.

The invention claimed is:

1. An imaging device comprising:
   receiver optics for receiving and focusing radiation emanating from a scene, said radiation comprising a first wavelength selected from a first spectral band, and further comprising a second spectral band, wherein said first wavelength is substantially a multiplicative factor less than the midpoint of said second spectral band;
   a diffractive and focusing surface, optically coupled with said receiver optics, wherein said diffractive and focusing surface diffracts said first wavelength received from said receiver optics at an order of diffraction substantially equal to said multiplicative factor, and further diffracts said second spectral band received from said receiver optics at a first order of diffraction;
   a first diffractive and focusing arrangement, optically coupled with said diffractive and focusing surface, wherein said first diffractive and focusing arrangement diffracts said first wavelength received from said diffractive and focusing surface at a first order of diffraction, and further diffracts said second spectral band received from said diffractive and focusing surface at a zeroth order of diffraction, and
   a second diffractive and focusing arrangement, optically coupled with said first diffractive and focusing arrangement, wherein said second diffractive and focusing arrangement diffracts said first wavelength received from said first diffractive and focusing arrangement at a first order of diffraction, and further diffracts said second spectral band received from said first diffractive and focusing arrangement at a zeroth order of diffraction, such that said first wavelength and second spectral band emanating from said second diffractive and focusing arrangement focuses at a substantially common focal length along an optical axis, and at a substantially common focal plane width perpendicular to said optical axis, producing a final image with substantially no longitudinal chromatic aberration and substantially no transverse chromatic aberration.

2. The imaging device of claim 1, wherein said first spectral band is approximately 0.8-1.8 μm.

3. The imaging device of claim 1, wherein said second spectral band is approximately 3.6-4.9 μm.

4. The imaging device of claim 1, wherein said first wavelength is approximately 1.06 μm.

5. The imaging device of claim 1, wherein said multiplicative factor is selected from the list consisting of:
   three; four; and five.

6. The imaging device of claim 1, further comprising a visualization arrangement optically coupled with said second diffractive and focusing arrangement, said visualization arrangement adapted to display said radiation.

7. The imaging device of claim 6, wherein said visualization arrangement comprises a semiconductor imaging device.

8. The imaging device of claim 1, further comprising at least one lens optically coupled with said first diffractive and focusing arrangement and with said second diffractive and focusing arrangement, for receiving said radiation with a substantially wide field of view.

9. The imaging device of claim 1, wherein at least one of said diffractive and focusing surface, said first diffractive and focusing arrangement and said second diffractive and focusing arrangement comprises a separate diffractive arrangement mechanically and optically coupled with a separate focusing arrangement.

10. The imaging device of claim 1, wherein at least one of said diffractive and focusing surface, said first diffractive and focusing arrangement and said second diffractive and focusing arrangement comprises a diffractive arrangement integrally formed with a focusing arrangement.

11. The imaging device of claim 1, wherein the density of the diffraction pattern of at least one of said first diffractive and focusing arrangement and said second diffractive and focusing arrangement is approximately 12 lines/mm.

12. The imaging device of claim 1, wherein the diffraction pattern of at least one of said first diffractive and focusing arrangement and said second diffractive and focusing arrangement comprises concentric circles.

13. The imaging device of claim 12, wherein said concentric circles are more closely spaced towards the perimeter of said at least one of said first diffractive and focusing arrangement and said second diffractive and focusing arrangement.

14. The imaging device of claim 12, wherein the boundary width between said concentric circles is not greater than approximately 8 μm.

15. The imaging device of claim 12, wherein the surface roughness of said diffraction pattern is less than approximately 0.02 μm.

16. The imaging device of claim 1, further comprising at least one additional diffractive and focusing arrangement, optically coupled with said second diffractive and focusing arrangement, wherein said additional diffractive and focusing arrangement diffracts said first wavelength received from said second diffractive and focusing arrangement at a first order of diffraction.

17. A method for correcting chromatic aberrations, the method comprising the procedures of:
   receiving radiation emanating from a scene, said radiation comprising a first wavelength selected from a first spectral band, and further comprising a second spectral band, wherein said first wavelength is substantially a multiplicative factor less than the midpoint of said second spectral band;
   diffracting said first wavelength at an order of diffraction substantially equal to said multiplicative factor, and further diffracting said second spectral band at a first order of diffraction, with a diffractive and focusing surface;
   diffracting said first wavelength received from said diffractive and focusing surface at a first order of diffraction, and further diffracting said second spectral band received from said diffractive and focusing surface at a zeroth order of diffraction, with a first diffractive and focusing arrangement, and
   further diffracting said first wavelength received from said first diffractive and focusing arrangement at a first order of diffraction, and further diffracting said second spectral band received from said first diffractive and focusing arrangement at a zeroth order of diffraction, with a second diffractive and focusing arrangement, such that said first wavelength and second spectral band emanating from said second diffractive and focusing arrangement focuses at a substantially common focal length along an optical axis, and at a substantially common focal plane width perpendicular to said optical axis, producing a final image with substantially no longitudinal chromatic aberration and substantially no transverse chromatic aberration.

18. The method of claim 17, wherein said first spectral band is approximately 0.8-1.8 μm.

19. The method of claim 17, wherein said second spectral band is approximately 3.6-4.9 μm.

20. The method of claim 17, wherein said first wavelength is approximately 1.06 μm.

21. The method of claim 17, wherein said multiplicative factor is selected from the list consisting of:
   three; four; and five.

* * * * *